United States Patent

Lau et al.

[11] Patent Number: 6,040,409
[45] Date of Patent: Mar. 21, 2000

[54] POLYMER COMPOSITIONS

[75] Inventors: Willie Lau, Ambler; Michael DeWayne Kelly, North Wales; Dennis Paul Lorah, Lansdale; David Ralph Heinley, Schwenksville, all of Pa.

[73] Assignee: Rohm and Haas Company, Phila., Pa.

[21] Appl. No.: 09/074,062

[22] Filed: May 7, 1998

Related U.S. Application Data

[60] Provisional application No. 60/047,261, May 21, 1997.
[51] Int. Cl.[7] .......................... C08F 20/10; C08F 120/10; C08F 220/10
[52] U.S. Cl. .................... 526/328; 526/317.1; 526/318.4
[58] Field of Search ................................ 526/328, 317.1, 526/318.4

[56] References Cited

U.S. PATENT DOCUMENTS

| 5,085,695 | 2/1992 | Randen et al. | 106/8 |
| 5,521,266 | 5/1996 | Lau | 526/200 |

FOREIGN PATENT DOCUMENTS

| 0708401A1 | 6/1997 | European Pat. Off. |
| 19533269 A1 | 3/1997 | Germany . |

Primary Examiner—James J. Seidleck
Assistant Examiner—U. K. Rajguru

[57] ABSTRACT

Polymer compositions which are useful in floor polish compositions as wax replacements are disclosed. The compositions provide improved repair properties in floor polishes and provide a non-slippery floor polish.

5 Claims, No Drawings

POLYMER COMPOSITIONS

This application claims benefit of provisional application 60,047,261 filed May 21, 1997.

This invention relates to polymer compositions, more specifically this invention relates to polymer compositions which are useful in floor polish compositions.

Floor polish compositions typically contain wax to enhance resistance properties and maintenance response. As a floor coated with wax-containing polish is exposed to walking traffic, the polish becomes scuffed and develops black heel marks. Repair of the damaged polish is typically attempted through the use of a burnishing machine. It is hoped that the repair will accomplish removal of scuffs and black marks, increase the gloss of the polish, and not scratch the polish. Although wax-containing floor polishes can be repaired through the process of burnishing, there is a continuing need for floor polish compositions that provide improved repair properties.

Floor polish compositions which contain wax may be slippery. The slippery surface may result in injuries due to slips and falls. There is a continuing need for non-slippery floor polish compositions. It is believed that the addition of a soft, hydrophobic emulsion polymer composition with pseudo-crystallinity to a floor polish composition will improve the repair properties of the floor polish and make the floor polish less slippery. Soft hydrophobic emulsion polymer compositions with pseudo-crystallinity have been difficult to prepare due to the hydrophobicity of the monomers necessary to prepare the polymers.

U.S. Pat. No. 5,521,266 discloses a method for forming polymers from hydrophobic monomers. The disclosed method utilizes macromolecular organic compounds which have a hydrophobic cavity to complex monomers which have low water solubility. This enables the formation of polymers from low water solubility monomers by emulsion polymerization. Suitable monomers for use in the method for forming polymers include lauryl methacrylate.

Despite the disclosure of the prior art, there is a continuing need for a soft hydrophobic emulsion polymer composition with pseudo-crystallinity for use in floor polish compositions.

We have surprisingly found that the use of the polymer compositions of this invention allows a reduction in the amount of wax in floor polish compositions, while improving the repair properties for the floor polish, and making the floor polish less slippery.

The present invention provides a polymer composition comprising as polymerized units:
a) from 9.5 to 100 parts by weight of at least one $C_{16}$ to $C_{40}$ alkyl ester of (meth)acrylic acid;
b) from 0 to 90 parts by weight of at least one ethylenically unsaturated monomer;
c) from 0 to 90 parts by weight of at least one ethylenically unsaturated acid containing monomer or salts thereof, and
d) from 0 to 60 parts by weight of at least one alkali soluble resin.

In another embodiment, the present invention provides a method for making a floor polish composition comprising: admixing
a) from 10 to 90 parts by weight of a polymer composition comprising as polymerized units:
from 9.5 to 100 parts by weight of at least one $C_{16}$ to $C_{40}$ alkyl ester of (meth)acrylic acid;
from 0 to 90 parts by weight of at least one ethylenically unsaturated monomer;
from 0 to 90 parts by weight of at least one ethylenically unsaturated acid containing monomer or salts thereof; and
from 0 to 60 parts by weight of at least one alkali soluble resin; with
b) from 0 to 90 parts by weight alkali soluble resin;
c) from 10 to 90 parts by weight emulsion polymer floor finish vehicle; and
d) from 10 to 80 parts by weight water.

The present invention also provides a floor polish composition comprising:
from 10 to 90 parts by weight emulsion polymer floor finish vehicle, from 0 to 90 parts by weight alkali soluble resin,
from 10 to 90 parts by weight polymer composition comprising as polymerized units:
from 9.5 to 100 parts by weight of at least one $C_{16}$ to $C_{40}$ alkyl ester of (meth)acrylic acid;
from 0 to 90 parts by weight of at least one ethylenically unsaturated monomer;
from 0 to 90 parts by weight of at least one ethylenically unsaturated acid containing monomer or salts thereof;
from 0 to 60 parts by weight of at least one alkali soluble resin; and
from 10 to 80 parts by weight water.

The compositions of this invention may be prepared by a single stage or multi-stage process. The process may be an emulsion polymerization such as the process described in U.S. Pat. No. 5,521,266. The process may also be solution polymerization followed by emulsification as described in U.S. Pat. No. 5,539,021, mini-emulsion polymerization, or micro-emulsion polymerization. Emulsion polymerization is preferred. In the process utilized for preparing the samples within this application, a first stage was prepared by adding a monomer emulsion and sodium persulfate to a solution containing methyl-β-cyclodextrin ("CD"), deionized water, and surfactant. The first stage was reacted at 85° C. A second stage was prepared by making a second monomer emulsion and feeding the second monomer emulsion and a sodium persulfate solution to the reacted first stage. The second stage was reacted at 85° C.

The polymer compositions of this invention are compositions which contain as polymerized units from 0 to 100 parts by weight, preferably from 40 to 99 parts by weight, more preferably 90 to 98 parts by weight of at least one $C_{16}$ to $C_{40}$ alkyl ester of (meth)acrylic acid. It is preferred that the alkyl ester of (meth)acrylic acid be a $C_{16}$ to $C_{30}$ alkyl ester of (meth)acrylic acid. It is more preferred that the alkyl ester of (meth)acrylic acid be a $C_{16}$ to $C_{18}$ alkyl ester of (meth)acrylic acid. Suitable alkyl esters of (meth)acrylic acid include cetyl (meth)acrylate, stearyl (meth)acrylate, behenyl (meth)acrylate, and eicosyl (meth)acrylate. Beneficial properties in floor polishes may be obtained by utilizing more than one $C_{16}$ to $C_{40}$ alkyl ester of (meth)acrylic acid.

The polymer composition of this invention also contains as polymerized units from 0 to 90 parts by weight, preferably 0 to 50 parts by weight, more preferably 1 to 20 parts by weight of at least one ethylenically unsaturated monomer. Suitable ethylenically unsaturated monomers for use in the preparation of the polymer compositions of this invention include, but are not limited to (meth)acrylic ester monomers including methyl acrylate, ethyl acrylate, butyl acrylate, 2-ethylhexyl acrylate, decyl acrylate, methyl methacrylate, butyl methacrylate, hydroxyethyl methacrylate, and hydroxypropyl acrylate; acrylamide or substituted acrylamides; styrene or substituted styrene; vinyl acetate or other vinyl esters; vinyl monomers such as vinyl chloride, vinylidene chloride, N-vinyl pyrolidone; and acrylonitrile or methacrylonitrile. Butyl acrylate, methyl methacrylate, and styrene are preferred. More preferred are butyl acrylate and methyl methacrylate.

The polymer composition of this invention also contains as polymerized units from 0 to 90 parts by weight, preferably 0 to 50 parts by weight, more preferably 1 to 15 parts by weight ethylenically unsaturated acid containing monomer or salts thereof. Suitable ethylenically unsaturated acid containing monomers include, but are not limited to acrylic acid, methacrylic acid, crotonic acid, phosphoethyl methacrylate, 2-acrylamido-2-methyl-1-propanesulfonic acid, sodium vinyl sulfonate, itaconic acid, fumaric acid, maleic acid, monomethyl itaconate, monomethyl fumarate, monobutyl fumarate, and maleic anhydride. Acrylic acid and methacrylic acid are preferred. Methacrylic acid is more preferred.

The polymer composition of this invention also contains as polymerized units from 0 to 60 parts by weight, preferably 0 to 40 parts by weight, more preferably 0 to 20 parts by weight alkali soluble resin. Alkali soluble resins useful in this invention are those typically with a weight average molecular below 500,000, preferably below 100,000, more preferably below 50,000.

The polymer compositions of this invention are useful in floor polish compositions. Floor polish compositions typically are emulsions which contain an emulsion polymer floor finish vehicle, water, alkali soluble resin, biocide, polyethylene wax, polypropylene wax, and coalescent solvents. The compositions of this invention are also useful in applications such as architectural and industrial coatings including paints, wood coatings, inks; adhesives; mastics; plastics; plastic additives; petroleum additives and the like.

The polymer compositions of this invention are typically used in floor polish compositions by admixing from 10 to 90 parts by weight polymer composition of this invention by weight with a floor polish composition. It is preferred that from 10 to 50 parts by weight polymer composition of this invention by weight be admixed with the floor polish composition. It is more preferred that from 15 to 25 parts by weight polymer composition of this invention by weight be admixed with the floor polish composition.

The emulsion polymer floor finish vehicle may be prepared by single stage or multi-stage emulsion polymerization. Emulsion polymerization processes are known in the art and are disclosed, for example in U.S. Pat. No. 5,346,954. Multi-stage polymer processes are also known in the art and are disclosed, for example, in U.S. Pat. Nos. 4,325,856, 4,654,397, and 4,814,373. Suitable monomers for use in the preparation of the emulsion polymer floor finish vehicle include, but are not limited to acrylic ester monomers including methyl (meth)acrylate, ethyl (meth)acrylate, butyl (meth)acrylate; acrylamide or substituted acrylamides; styrene or substituted styrene; vinyl acetate or other vinyl esters; vinyl monomers such as vinyl chloride, vinylidene chloride, N-vinyl pyrolidone; and acrylonitrile or methacrylonitrile.

Low levels of copolymerized ethylenically unsaturated acid monomers such as, for example, 0.1%–10%, by weight based on the weight of the emulsion-polymerized polymer, acrylic acid, methacrylic acid, itaconic acid, fumaric acid, maleic acid, and maleic anhydride may also be used in the emulsion polymer floor finish vehicle.

Chain transfer agents may be used to control the molecular weight of the emulsion polymer floor finish vehicle. Suitable chain transfer agents are mercaptans, such as, for example, dodecylmercaptan. The chain transfer agent may be used at from 0.1% to 10% based on the total weight of the polymeric composition.

Conventional crosslinking agents such as, for example, a polyaziridine, polyisocyanate, polycarbodiimide, polyamine and a polyvalent metal compound may be used in the emulsion polymer floor finish vehicle, providing that the crosslinking agent does not inhibit film formation. Typically, from 0.05% to 25% of the crosslinking agent is used, based on the weight of the polymer solids.

Emulsion polymer floor finish vehicles such as Rhoplex®1421, Acrysol®644, and Acrysol®Plus are typically used in floor polish compositions to provide hard films with impact resistance. The range of emulsion polymer floor finish vehicle typically utilized in floor polishes is from 10 to 90 parts by weight. It is preferred that from 50 to 90 parts by weight of emulsion polymer floor finish vehicle be utilized in the floor polish. It is more preferred that from 70 to 90 parts by weight of emulsion polymer floor finish vehicle be utilized in the floor polish.

Alkali soluble resins are disclosed in U.S. Pat. No. 3,037,952. By alkali soluble resin is meant a resin typically with a weight average molecular below 500,000, preferably below 100,000, more preferably below 50,000. The alkali soluble resin contains an acid functional group which typically is present at greater than 10% of the resin on a weight basis. The alkali soluble resin forms a clear to translucent solution typically at a range of from pH 6 to pH 10. The alkali soluble resin may be prepared by the same process and with the same materials as the emulsion polymer floor finish vehicle described above.

The range of alkali soluble resin typically utilized in floor polishes is from 0 to 90 parts by weight. It is preferred that from 5 to 50 parts by weight of alkali soluble resin be utilized in the floor polish. It is more preferred that from 10 to 30 parts by weight of alkali soluble resin be utilized in the floor polish.

Coalescents are typically used to aid film formation in floor polishes. Suitable coalescents include diethylene glycol ethyl ether and tripropylene glycol methyl ether. Coalescents are typically utilized in floor polish compositions at from 0.1 to 10 parts by weight.

A biocide such as Kathon®CG/ICP may be added to the floor polish composition to preserve the composition while in the bottle. Biocides are typically utilized in floor polish compositions at from 0.01% to 0.2% by weight.

Wax emulsions such as Epolene®E-43N and A-C 325N are typically used in floor polish compositions to provide scuff and black mark resistance. Wax emulsions are typically utilized in floor polish compositions at from 10 to 90 parts by weight on a solids basis. It is preferred that from 10 to 50 parts by weight on a solids basis of wax emulsion be utilized in the floor polish. It is more preferred that from 10 to 20 parts by weight on a solids basis of wax emulsion be utilized in the floor polish.

When the polymer compositions of this invention are incorporated into floor polish compositions, the resulting floor polish has improved repair properties and slip resistance.

The following abbreviations are used throughout this patent application:

LMA=lauryl methacrylate SMA=stearyl methacrylate St=styrene MMA=methyl methacrylate BA=butyl acrylate MAA=methacrylic acid IBOMA=isobornyl methacrylate nDDM=n-dodecyl mercaptan Id.=sample identification number CD=methyl-β-cyclodextrin g=grams 0° C.=degrees centigrade $NH_4OH$=aqueous ammonia J-678=Joncryl® -678 Comp=Comparative BMR=Black Mark Resistance SR=Scuff Resistance LC=long chain (meth)acrylate= methacrylate and acrylate The following Table lists some of the materials used in this patent application and their sources:

| Material | Function | Source |
|---|---|---|
| Triton ®XN-45S | anionic surfactant | Union Carbide |
| Pluronic ®L31 | surfactant | BASF |
| Joncryl ®-678 | alkali soluble resin | SC Johnson |
| Siponate ®DS-4 | surfactant | Rhone-Poulenc |
| Rhoplex ®1421 | polymer | Rohm and Haas |
| Acrysol ®644 | polymer | Rohm and Haas |
| Acrysol ®Plus | polymer | Rohm and Haas |
| Kathon ®CG/ICP | biocide | Rohm and Haas |
| Poly Emulsion ® 325N35 | wax | ChemCor |
| Epolene ®E-43N | wax | ChemCor |
| Fluorad ®FC-129 | surfactant | 3M Company |
| SE-21 | silicone | Wacker Silicones Corporation |

EXAMPLE 1

For stage 1, 400 g deionized water, Triton® XN-45S anionic surfactant T#1), and 28.6 g CD were introduced into a 4-liter round bottom flask with four necks equipped with a mechanical stirrer, temperature control device, condenser, monomer and initiator feed lines, and a nitrogen inlet at room temperature. The contents were heated to 85° C. while stirred under a nitrogen purge. A monomer emulsion of 31.3 g deionized water, 0.4 g Triton® XN-45S anionic surfactant, 33.8 g LMA, 7.5 g BA, 33 g MMA, and 0.75 g MAA was prepared separately. Solutions of 0.35% by weight sodium carbonate (based on the total monomer weight in stage 1 and stage 2) in 25 g deionized water and 0.35% by weight sodium persulfate (based on the total monomer weight in stage 1 and stage 2) in 30 g deionized water were introduced into the reaction kettle. The monomer emulsion was fed over a period of 20 minutes together with an initiator solution of 0.05% sodium persulfate (based on the total monomer weight in stage 1 and stage 2) in 210 g deionized water.

For stage 2, a monomer emulsion was prepared using 625 g deionized water, 7.8 g Triton® XN-45S anionic surfactant, and monomers according to Table 1. Immediately after the end of the stage 1 monomer emulsion feed, the stage 2 monomer emulsion was fed over a period of 3 hours together with the sodium persulfate initiator solution.

EXAMPLE 2

A second set of samples to be tested in floor polishes was prepared by combining water, surfactant, J-678, CD, and $NH_4OH$ in a kettle. To the kettle was then added a solution of ammonium persulfate in water. Finally, a monomer emulsion containing water, surfactant, and SMA and an ammonium persulfate solution in water were added to the kettle. The monomers were reacted at 85° C.

Using the same equipment set up as Example 1, 543 g deionized water was introduced into the reaction flask at room temperature. The contents were heated to 55° C. while stirred under a nitrogen purge. At 55° C., $NH_4OH$ as set forth in Table 2, CD as set forth in Table 2, J-678 as set forth in Table 2, and 16 g Pluronic® L31 were introduced into the reaction flask. The contents were stirred for 2 hours at 55° C. and heated to 85° C. A monomer emulsion containing 104 g deionized water, 2.8 g of a 23% solution of Siponate® DS-4, SMA as set forth in Table 2, and 16 g Pluronic L31 was prepared separately. A solution of 7 g ammonium persulfate in 25 g deionized water was added to the kettle. The monomer emulsion was then added to the kettle at a rate of 5.5 g per minute. An initiator solution of 7 g ammonium persulfate in 165 g deionized water was co-fed at a rate of 1 g per minute.

TABLE 2

| Id. | $NH_4OH$ (28%) | CD (50%) | J-678 | SMA |
|---|---|---|---|---|
| 14 | 37.1 | 0 | 160 | 640 |
| 15 | 92.8 | 14.9 | 400 | 400 |
| 16 | 37.1 | 14.9 | 160 | 640 |

EXAMPLE 3

Floor Polish Application And Testing

Floor polishes were prepared according to the following formulation:

| Material In Order Of Addition | Percent By Weight |
|---|---|
| Water | 30.73 |
| Kathon ®CG/ICP | 0.03 |
| Acrysol ®644 (42%) | 5.52 |

TABLE 1

| Id. | LMA | SMA | BA | MMA | St | IBOMA | nDDM | MAA | T#1 |
|---|---|---|---|---|---|---|---|---|---|
| 1 | 0 | 1395 | 0 | 75 | 0 | 0 | 0 | 30 | 11.9 |
| 2 | 0 | 1395 | 0 | 75 | 0 | 0 | 7.5 | 30 | 11.9 |
| 3 | 0 | 975 | 0 | 510 | 0 | 0 | 0 | 15 | 11.9 |
| 4 | 705 | 690 | 0 | 75 | 0 | 0 | 0 | 30 | 11.9 |
| 5 | 1020 | 375 | 0 | 75 | 0 | 0 | 30 | 11.9 | |
| 6 | 0 | 780 | 0 | 705 | 0 | 0 | 0 | 15 | 11.9 |
| 7 | 0 | 675 | 150 | 660 | 0 | 0 | 0 | 15 | 24.5 |
| 8 | 0 | 525 | 150 | 150 | 660 | 0 | 0 | 15 | 24.5 |
| 9 | 0 | 600 | 150 | 150 | 585 | 0 | 0 | 15 | 24.5 |
| 10 | 0 | 675 | 150 | 150 | 510 | 0 | 0 | 15 | 24.5 |
| 11 | 0 | 750 | 150 | 150 | 435 | 0 | 0 | 15 | 24.5 |
| 12 | 0 | 675 | 0 | 150 | 0 | 650 | 0 | 15 | 24.5 |
| 13* | 1395 | 0 | 0 | 75 | 0 | 0 | 0 | 30 | 11.9 |

*= Comparative 3 for testing purposes (LMA)

-continued

| Material In Order Of Addition | Percent By Weight |
|---|---|
| Fluorad ®FC-129 (50%) | 0.02 |
| Diethylene Glycol Ethyl Ether | 5.78 |
| Tripropylene Glycol Methyl Ether | 1.02 |
| Rhoplex ®1421 (38%) | 45.76 |
| Epolene ®E-43N (40%) | 4.35 |
| Poly Emulsion ®325N35 (35%) | 4.97 |
| SE-21 | 0.02 |

The sample above is Comparative 2 for testing purposes. For samples of the invention, an equal weight of the polymer composition of the invention was substituted for Epolene®E-43N and Poly Emulsion® 325N35. For samples of the invention with alkali soluble resin, an equal weight of Acrysol® Plus was substituted for Acrysol®644. For the no-wax control sample (Comparative 1 for testing purposes), the Rhoplex® 1421 level was increased on an equal weight basis to account for the removal of Epolene®E-43N and Poly Emulsion® 325N35.

The floor polishes were tested for wear in a corridor having a vinyl asbestos tile floor. The corridor was first stripped of residual polish. The floor was then repolished as follows:

The stripped floor was divided into equal sections perpendicular to the normal direction of corridor flow. To each section was applied a coat of the polish to be tested. The polish was applied with a mohair applicator at a rate of approximately 186 square meters/3.8 liters. Three additional coats of polish were applied after allowing one hour for the previous coat to dry.

The polished tile floor was subjected to a daily traffic load of 800 to 1,200 passes. The overall durability of the polishes in terms of scuff and black heel mark resistance after being subjected to traffic was rated at weekly intervals on a 1 to 10 scale in ascending order of improving performance. Scuff was rated based on the number, size, and depth of the scuff marks. Black mark rating was based on the number, size, and darkness of the black marks. The polishes were then burnished at high speed with a propane powered burnishing machine operating at approximately 2,100 rotations per minute to repair the traffic damage. Repair was subjectively rated in terms of overall gloss increase, scuff and black mark removal, and scratching as a result of the high speed burnishing. Results of the tests with non alkali soluble resin containing floor polishes are listed in Table 3. Results of the tests with alkali soluble resin containing floor polishes are listed in Table 4.

TABLE 3

| Sample | SR | BMR | Repair | LC Methacrylate |
|---|---|---|---|---|
| Comp 1 | 4 | 6 | fair | none |
| Comp 2 | 7 | 9 | good | none |
| Comp 3 | 6 | 7 | fair | LMA |
| 1 | 7 | 9 | very good | SMA |
| 3 | 6 | 8 | very good | SMA |
| 4 | 8 | 9 | excellent | SMA/LMA |

The above data demonstrates that the compositions of this invention can be substituted for wax in alkali soluble resin-free floor polishes without losing performance in terms of scuff resistance and black mark resistance. Floor polishes prepared with the compositions of this invention have better repair properties than wax containing conventional floor polishes.

TABLE 4

| Sample | SR | BMR | Repair | LC Methacrylate |
|---|---|---|---|---|
| Comp 1 | 5 | 5 | poor | none |
| Comp 2 | 7 | 8 | fair | none |
| 16 | 8 | 8 | fair | SMA |
| 15 | 9 | 8 | good | SMA |

The above data demonstrates that the compositions of this invention can be substituted for wax in alkali soluble resin containing floor polishes without losing performance in terms of scuff resistance and black mark resistance. Floor polishes prepared with the compositions of this invention have better repair properties than wax containing conventional floor polishes.

The samples were also tested for slip resistance. Three vinyl composition tiles were coated with floor polish by applying a 4 ml quantity of the polish in a puddle in the center of the area to be coated. A Johnson and Johnson 2 inch by 2 inch 12-ply gauze was allowed to absorb as much of the polish as possible. The polish was dispersed evenly over the surface of the tile with the saturated gauze pad, first by up and down and then by crosswise strokes. No pressure was used in applying the test polish to the tile. After the polish had dried at 70 degrees Fahrenheit/55% relative humidity constant conditions, a second coat was applied in the same manner as the first. After the tiles had dried overnight, testing was performed.

The test was performed on the James friction testing machine. Slip resistance was reported as the static coefficient of friction which is a number between 0.00 and 1.00. The number is the average of four determinations run on the polish, the tile having been rotated 90° between each determination. The closer the number is to 1.00, the less slippery the polish. The results of the tests are shown in Table 5.

TABLE 5

| Id. | Slip Resistance |
|---|---|
| Comp 2 | 0.63 |
| Comp 1 | >0.9 |
| 3 | 0.85 |
| 1 | 0.81 |

The above results demonstrate that the compositions of this invention provide floor polishes with better slip resistance than wax containing floor polishes.

What is claimed is:

1. An emulsion polymer composition comprising as polymerized units:
   a) from 9.5 to 100 parts by weight of at least one $C_{16}$ to $C_{40}$ alkyl ester of (meth)acrylic acid;
   b) from 0 to 90 parts by weight of at least one ethylenically unsaturated monomer;
   c) from 0 to 90 parts by weight of at least one ethylenically unsaturated acid containing monomer or salts thereof, and
   d) from 0 to 60 parts by weight of at least one alkali soluble resin; wherein the emulsion polymer composition is prepared by emulsion polymerization.

2. A composition according to claim 1 wherein the composition comprises:
   a) from 40 to 99 parts by weight of at least one $C_{16}$ to $C_{40}$ alkyl ester of (meth)acrylic acid,
   b) from 0 to 50 parts by weight of at least one monomer selected from the group consisting of methyl methacrylate and butyl acrylate; and c) from 0 to 50 parts by weight methacrylic acid.

3. A composition according to claim 1 wherein the composition comprises:
   a) from 90 to 98 parts by weight of stearyl (meth)acrylate,
   b) from 1 to 20 parts by weight of methyl methacrylate; and
   c) from 1 to 15 parts by weight methacrylic acid.

4. A method for making a floor polish composition comprising:
   admixing
   a) from 10 to 90 parts by weight of an emulsion polymer composition comprising as polymerized units:
      from 9.5 to 100 parts by weight of at least one $C_{16}$ to $C_{40}$ alkyl ester of (meth)acrylic acid;
      from 0 to 90 parts by weight of at least one ethylenically unsaturated monomer;
      from 0 to 90 parts by weight of at least one ethylenically unsaturated acid containing monomer or salts thereof; and
      from 0 to 60 parts by weight of at least one alkali soluble resin; with
   b) from 0 to 90 parts by weight alkali soluble resin;
   c) from 10 to 90 parts by weight emulsion polymer floor finish vehicle; and
   d) from 10 to 80 parts by weight water; wherein the emulsion polymer composition is prepared by emulsion polymerization.

5. A floor polish composition comprising:
   from 10 to 90 parts by weight emulsion polymer floor finish vehicle,
   from 0 to 90 parts by weight alkali soluble resin,
   from 10 to 90 parts by weight emulsion polymer composition comprising as polymerized units;
   from 9.5 to 99 parts by weight of at least one $C_{16}$ to $C_{40}$ alkyl ester of (meth)acrylic acid;
   from 0 to 90 parts by weight of at least one ethylenically unsaturated monomer;
   from 0 to 90 parts by weight of at least one ethylenically unsaturated acid containing monomer or salts thereof;
   from 0% to 60% by weight of at least one alkali soluble resin; and
   from 10 to 80 parts by weight water, wherein the emulsion polymer composition is prepared by emulsion polymerization.

* * * * *